United States Patent
Ganev et al.

(10) Patent No.: US 7,194,863 B2
(45) Date of Patent: Mar. 27, 2007

(54) TURBINE SPEED CONTROL SYSTEM AND METHOD

(75) Inventors: Evgeni Ganev, Torrance, CA (US); Mike S. Koerner, Rancho Palos Verdes, CA (US); Chung Y. Liu, Cerritos, CA (US)

(73) Assignee: Honeywell International, Inc., Morristown, NJ (US)

( * ) Notice: Subject to any disclaimer, the term of this patent is extended or adjusted under 35 U.S.C. 154(b) by 325 days.

(21) Appl. No.: 10/931,694

(22) Filed: Sep. 1, 2004

(65) Prior Publication Data

US 2006/0042262 A1   Mar. 2, 2006

(51) Int. Cl.
*F02C 9/16* (2006.01)
*F02C 9/26* (2006.01)

(52) U.S. Cl. .............. 60/773; 60/39.281; 137/599.07; 415/38

(58) Field of Classification Search .............. 60/39.25, 60/39.281, 773; 137/599.05, 599.06, 599.07; 415/38, 40

See application file for complete search history.

(56) References Cited

U.S. PATENT DOCUMENTS

| | | | |
|---|---|---|---|
| 3,660,977 A * | 5/1972 | Reynolds | ............... 60/39.281 |
| 3,939,328 A | 2/1976 | Davis | |
| 3,965,684 A | 6/1976 | Nomura | |
| 4,035,624 A | 7/1977 | Lardi | |
| 4,146,270 A | 3/1979 | Nurnberger et al. | |
| 4,185,203 A | 1/1980 | Takeuchi | |
| 4,464,577 A | 8/1984 | Wagner et al. | |
| 4,694,189 A | 9/1987 | Haraguchi et al. | |
| 5,179,875 A | 1/1993 | Brown | |
| 5,295,783 A | 3/1994 | Lesko et al. | |
| 5,332,959 A | 7/1994 | Malmquist et al. | |
| 5,789,822 A | 8/1998 | Calistrat et al. | |
| 5,953,902 A | 9/1999 | Jerye et al. | |
| 6,070,405 A | 6/2000 | Jerye et al. | |
| 6,105,370 A * | 8/2000 | Weber | .................. 60/733 |
| 6,316,841 B1 * | 11/2001 | Weber | .................. 290/4 C |
| 6,602,044 B1 | 8/2003 | Kuwabara et al. | |
| 2003/0091429 A1 | 5/2003 | Staroselsky et al. | |

FOREIGN PATENT DOCUMENTS

| | | |
|---|---|---|
| JP | 58200006 | 11/1983 |
| JP | 63090602 | 4/1988 |
| JP | 4134101 | 5/1992 |
| JP | 11166402 | 6/1999 |

* cited by examiner

*Primary Examiner*—L. J. Casaregola
(74) *Attorney, Agent, or Firm*—Oral Caglar, Esq.

(57) ABSTRACT

One embodiment of the invention provides a turbine control system that adjusts the control thresholds of two-position valves, which provide propellant to the turbine, based on turbine load so as to compensate for increased turbine speed overshoot at low load and the increased turbine speed undershoot at high load. These two-position on-off modulated valves are used in a bang-bang (fully open or fully closed) regulation scheme to eliminate or minimize speed droop by using variable speed bounds implemented as a function of load.

20 Claims, 6 Drawing Sheets

TURBINE SPEED CONTROL SYSTEM AND METHOD

FIELD OF THE INVENTION

Various embodiments of the invention pertain to power generation systems. More particularly, one embodiment of the invention pertains to a method and system for turbine speed control for a turbine-driven electric power generation system.

DESCRIPTION OF RELATED ART

Turbines are often used to generate power for both stationary and vehicle applications. They are usually driven by hot, compressed gas and are used to produce shaft, hydraulic, pneumatic or electric power. The energy to produce the hot gas may come from any of a number of sources.

Turbines are typically designed with an optimum rotational speed at which they provide optimum performance. Optimum performance refers to the maximum output power achieved for a given input of energy. Similarly, the devices driven by such turbines have optimum, and hopefully similarly matched, design speeds. In applications where the amount of input energy is limited, it is often desirable to maintain the turbine operating speed as close to its optimum design speed as possible. This is particularly true in vehicle applications where the available energy is typically limited to that which the vehicle can carry. The need for accurate turbine speed control is even more pronounced in aircraft applications, where the weight of the energy source (e.g., batteries, fuel, etc.) must be suspended in flight, and most pronounced in spacecraft applications where the energy source must be carried out of the atmosphere.

Speed control is challenging in vehicle applications because the loads on the turbine are often highly variable. In typical turbine power systems, speed control is provided by metering the flow of hot gases in proportion to the load, or inversely with the turbine speed. These systems provide somewhat more flow to the turbine at high loads, or low turbine speeds and somewhat less at low loads or high speeds. Many speed control algorithms exist that provide this function.

Proportional valves, valves that can be adjusted over some range of flow settings, are typically used in turbine speed control applications. However, proportional valves are much more complex, costly and less reliable than discrete 2-position valves, which are either open or closed. Furthermore, the control systems for proportional valves are more complex, especially in bipropellant combustion systems where two separate flows must be metered not only to control turbine speed but also to maintain the proper mixture of propellants.

The use of discrete 2-position valves to control the speed of a spacecraft turbine power unit with a bipropellant fuel system may operate in the following way. The discrete 2-position valves may be solenoid-actuated hydrogen and oxygen propellant valves that open when the turbine speed is below certain threshold speeds and close when the turbine speed is above other threshold speeds. This method of control, opening and closing valves, is sometimes referred to as a "bang-bang" control.

With constant speed thresholds, the maximum turbine speed is typically higher when a turbine operates with a low load than when it operates with a high load. The minimum turbine speed is lower when the turbine operates with a high load than when it operates with a low load. This is the case because of the time lag inherent in any control system. It takes a discrete amount of time, for example, to close the control valves and drain the reaction chamber and turbine inlet of hot gases. During a portion of this time, after the shutdown thresholds are reached, the turbine continues to accelerate. At low turbine loads this acceleration is more rapid. As a result there is more of a speed overshoot at low loads than at high turbine loads. Conversely, at high turbine loads it is found that there is more speed undershoot than at low turbine loads.

This low-speed undershoot and high-speed overshot results in a wider speed band than would be possible if the thresholds were adjusted for a constant overshoot and undershoot. The wider speed band is undesirable in that it results in lower turbine power system performance. This problem is typical in bang-bang control systems.

SUMMARY OF THE INVENTION

One embodiment of the invention provides a novel turbine speed control method (TSCM) for an electric power generation system (EPGS) using a turbine as a prime mover. The control is based on on/off modulation of two valves, hydrogen and oxygen. The turbine control provides speed control and temperature control for optimized system performance and minimized system weight. Furthermore, the TSCM provides a compensation for speed droop due to delays in valve operation. A bang-bang speed control method with dynamic load dependent, speed droop compensation is implemented to solve this speed droop. Control thresholds for the turbine speed are adjusted based on load so as to compensate for increased overshoot at low load and the increased undershoot at high load. Such unique control method enhances the performance of any control system using discrete two-position control valves and is particularly valuable in vehicular and aerospace turbine power applications.

DETAILED DESCRIPTION

Devices and apparatus that implement the embodiments of the various features of the invention will now be described with reference to the drawings. The drawings and the associated descriptions are provided to illustrate embodiments of the invention and not to limit the scope of the invention. Reference in the specification to "one embodiment" or "an embodiment" is intended to indicate that a particular feature, structure, or characteristic described in connection with the embodiment is included in at least an embodiment of the invention. The appearances of the phrase "in one embodiment" or "an embodiment" in various places in the specification are not necessarily all referring to the same embodiment. Throughout the drawings, reference numbers are re-used to indicate correspondence between referenced elements. In addition, the first digit of each reference number indicates the figure in which the element first appears.

In the following description, certain terminology is used to describe certain features of one or more embodiments of the invention. The term speed droop refers to variations in the minimum and maximum turbine speeds with load.

One embodiment of the invention provides a unique solution to adjust the control thresholds of two-position valves (e.g., solenoid valves) based on load so as to compensate for increased overshoot at low load and the increased undershoot at high load. These two-position on-off modulated valves are used in a bang-bang regulation scheme to eliminate or minimize speed droop by using variable speed references implemented as a function of load. By implementing load dependant speed references, a constant minimal operating speed of the turbine system is achieved. Other regulation schemes may be used as part of the invention.

Figure 1:
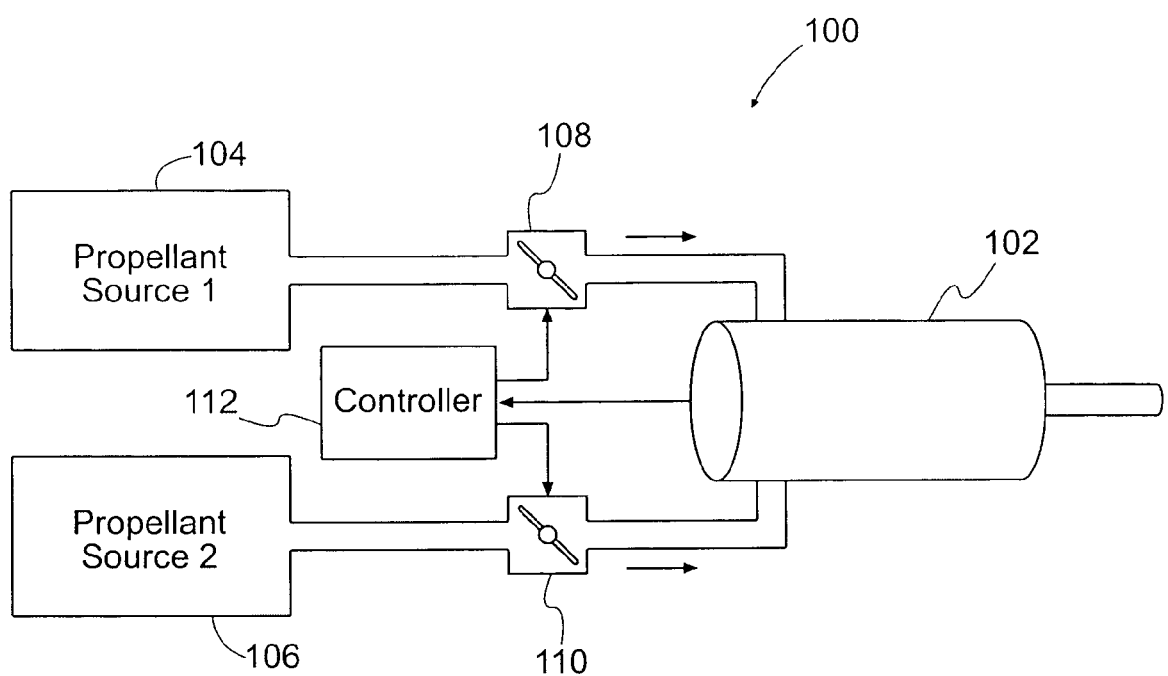
FIG. 1 illustrates a turbine system having two two-position valves that are controlled according to one embodiment of the invention.

FIG. 1 illustrates a turbine system 100 having two two-position valves that are controlled according to one embodiment of the invention. A reaction chamber and turbine 102 is coupled to propellant or fuel sources 104 and 106 (e.g., hydrogen and oxygen) with two-position valves 108 and 110 regulating the flow of fuels to the reaction chamber and turbine 102. A controller 112 is coupled to the two-position valves 108 and 110 to implement on/off modulation of the two valves 108 and 110 and provide constant turbine speed control to optimize system operation and reduce weight. The controller 112 may implement a turbine speed control method (TSCM) for an electric power generation system (EPGS) using the turbine 102 as a prime mover or power source.

Furthermore, the novel TSCM implemented by the controller 112 provides compensation for speed droop due to the delay in valve operation inherent in real valves. Such TSCM eliminates or substantially reduces the speed droop at higher loads. As a result of the TSCM, the weight and volume of the rotating assembly, including the turbine and generator, may be reduced, for example, by four percent (4%).

Active compensation of the speed droop by the controller 112 also allows using valves that have slow response times. Generally, slow response time valves have a lower cost and provide greater reliability. Hence, overall system cost and reliability are improved.

Another result of the novel TSCM implemented by the controller 112 is a reduced speed band, either by a reduction in the maximum speed, and increase in the minimum speed, or both. A reduction in maximum speed reduces mechanical stress and containment requirements on the turbine and generator, resulting in reduced system weight and volume. Increasing the minimum speed increases turbine and generator efficiency, which also reduces system weight and volume.

Another result of the novel TSCM is that this control method prevents valve actuation for time intervals that are less than the response time of the valve. This provides a more robust control system.

Yet another result of this novel TSCM is that it allows turbine speed to be adjusted with load if desired. In some applications it might be beneficial to slow a turbine down at low loads, for example, and speed it up at high loads, thus minimizing parasitic or windage losses at low loads.

According to two embodiments of the invention, turbine speed control may be achieved by either a constant frequency control and/or a bang-bang control. One or more implementations of the bang-bang control system are described below. The teachings of the bang-bang control system can be extended to a constant frequency control.

Figure 2:
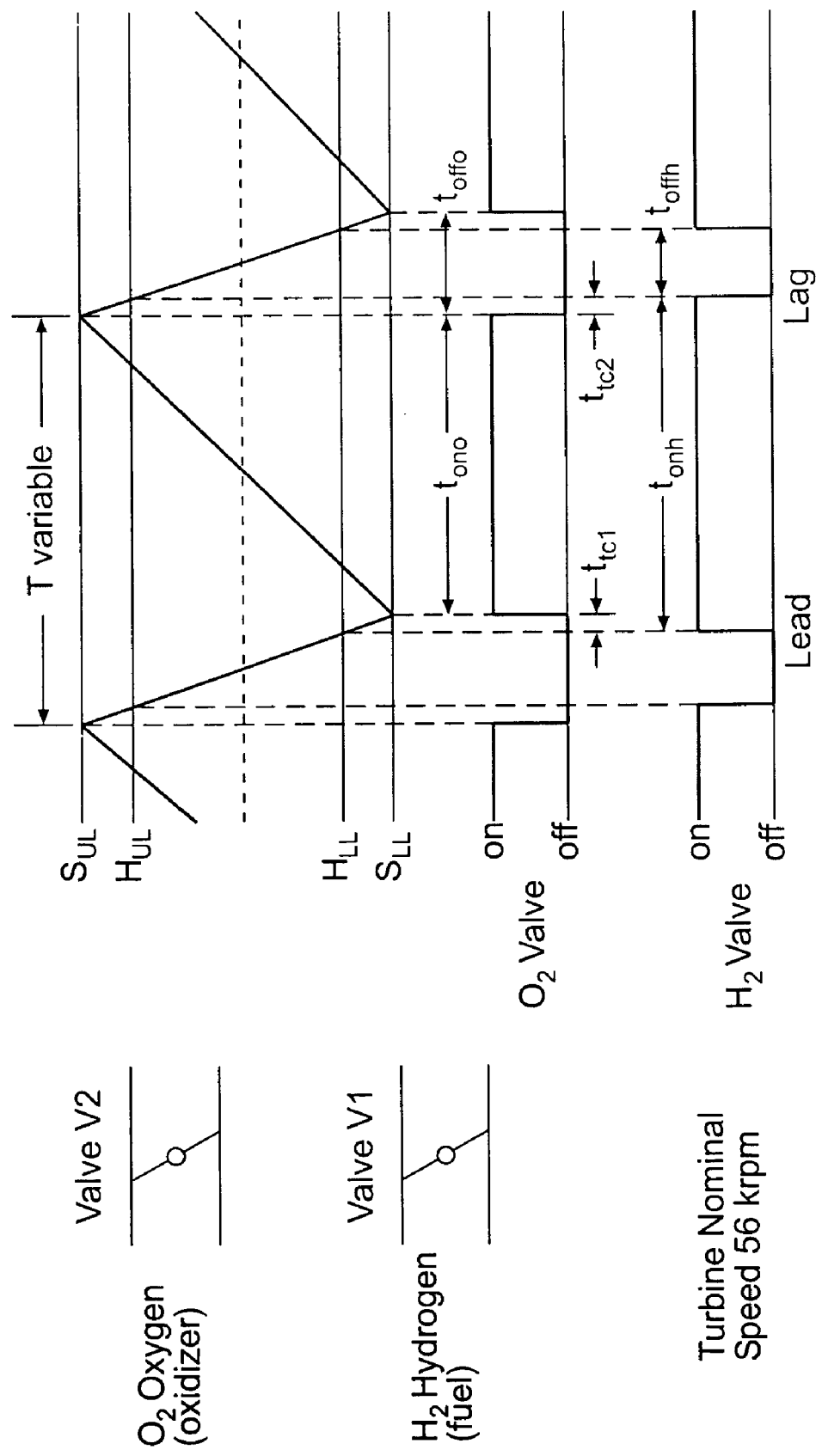
FIG. 2 is a timing diagram illustrating a typical bang-bang control with idealized valve operation according to one embodiment of the invention.

FIG. 2 is a timing diagram illustrating a typical bang-bang control with idealized valve (i.e., V1 and V2) operation (e.g., no delays) according to one embodiment of the invention. The $S_{UL}$ and $S_{LL}$ are the upper and the lower turbine speed limits or thresholds, respectively, at which the oxygen valve (V2) is turned OFF and ON. That is, when the turbine speed reaches the upper speed limit $S_{UL}$, the oxygen valve (V2) is turned OFF. Likewise, when the turbine speed reaches the lower speed limit $S_{LL}$, the oxygen valve (V2) is turned ON.

The $H_{UL}$ and $H_{LL}$ are the upper and lower speed limits, respectively, at which the hydrogen valve (V1) is turned OFF and ON. That is, when the turbine speed reaches the upper speed limit $H_{UL}$, the hydrogen valve (V1) is turned OFF and when the turbine speed reaches the lower speed limit $H_{LL}$, the hydrogen valve (V1) is turned ON. The speed limits $H_{UL}$ and $H_{LL}$ at which the hydrogen valve (V1) is closed and opened are kept between the speed limits $S_{UL}$ and $S_{LL}$ at which the oxygen valve (V2) is closed and opened to create lead and lag shifting. This feature prevents oxygen flow without hydrogen flow to prevent system overheating.

The duty cycle $D=t_{ON}/T$ is the ratio between the time the oxygen valve is opened and the total time. The duty cycle controls the average fuel flow resulting in proportional turbine torque. The magnitude of the lead and lag times control the cooling of the system. More lead and lag $t_{tc1}+t_{tc2}$ means more $H_2$ flow in the turbine which, in a fuel rich system, results in a lower average turbine inlet temperature.

The hydrogen $H_2$ valve V1 opens first. During the time period of $t_{tc1}$ the hydrogen valve V1 transitions from zero flow to high or full flow. Until the end of the time period $t_{tc1}$ only hydrogen $H_2$ gas flows into the turbine system. When the time period $t_{tc1}$ ends the oxygen $O_2$ valve V2 is opened so that both hydrogen $H_2$ and oxygen $O_2$ gases flow during the time period $t_{ono}$. The hydrogen valve V1 remains open for the time period $t_{onh}$ while the oxygen valve remains open for the time period $t_{ono}$. At the end of the time period $t_{ono}$ the oxygen $O_2$ valve V2 is closed while the hydrogen $H_2$ valve V1 is still open for an additional time $t_{tc2}$. After the time period $t_{tc2}$ elapses, both valves V1 and V2 are closed. That is, the hydrogen valve V1 remains closed during the time period $t_{offh}$ and the oxygen valve V2 remains closed during the time period $t_{offo}$. For the next cycle the sequence of events repeats in the same order.

Referring to FIG. 2, the equation $t_{onh}-t_{ono}=t_{tc1}+t_{tc2}$ defines or determines the average turbine inlet temperature. As $t_{tc1}+t_{tc2}$ increases, the average turbine inlet temperature decreases. Conversely, as $t_{tc1}+t_{tc2}$ decreases, the average turbine inlet temperature increases. The ability to adjust the turbine inlet temperature allows compensation for variations in propellant flow rates, for example, allowing the turbine to operate at optimal conditions.

Figure 3:
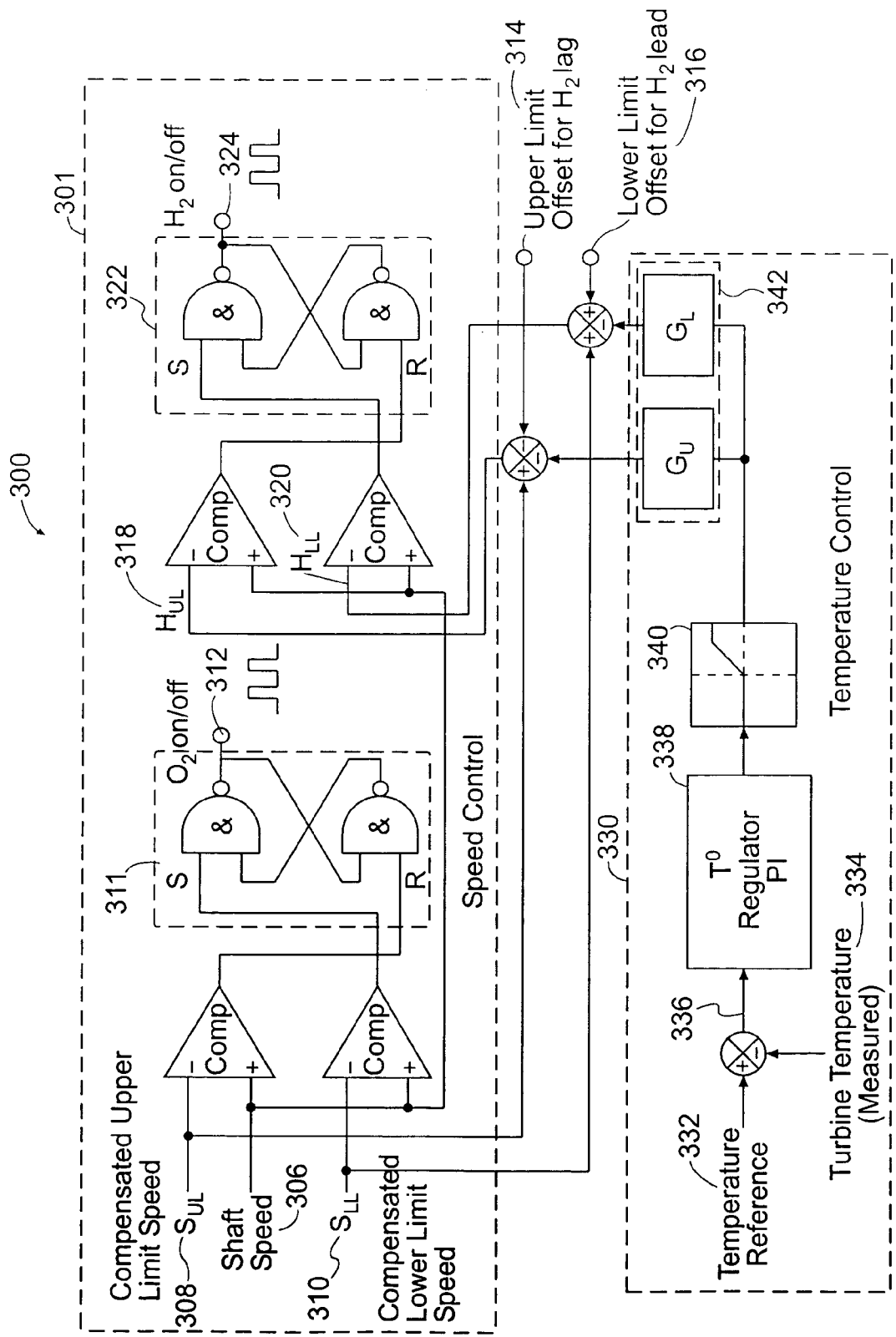
FIG. 3 is a block diagram illustrating a bang-bang regulator according to one embodiment of the invention.

FIG. 3 is a block diagram illustrating a bang-bang regulator 300 according to one embodiment of the invention. An open loop bang-bang regulator is selected for the speed control 301. The shaft speed 306 of the turbine is compared to the predefined upper speed limit $S_{UL}$ 308 and lower speed limit $S_{LL}$ 310 and the resulting signals are inputs to an RS trigger 311. The RS trigger 311 is used to generate an oxygen drive signal 312. The oxygen upper limit $S_{UL}$ 308 and lower limit $S_{LL}$ 310 are modified with additional Upper Limit Offset for $H_2$ lag 314 and Lower Limit Offset for $H_2$ lead 316 to create hydrogen upper $H_{UL}$ 318 and lower limits 320 $H_{LL}$. The corresponding RS trigger 322 is used to generate a hydrogen drive signal 324.

Temperature control 330 uses a closed-loop control scheme. The desired Temperature Reference 332 is compared with the measured Turbine Temperature 334. The error signal 336 is conditioned by a proportional integral regulator 338 followed by an amplitude limiting function 340. The output of the regulator 342 is used with two individual gains, $G_U$ and $G_L$, to modify the hydrogen lead and lag. Generally, the larger the lead and lag are, the lower the turbine temperature.

Figure 4:
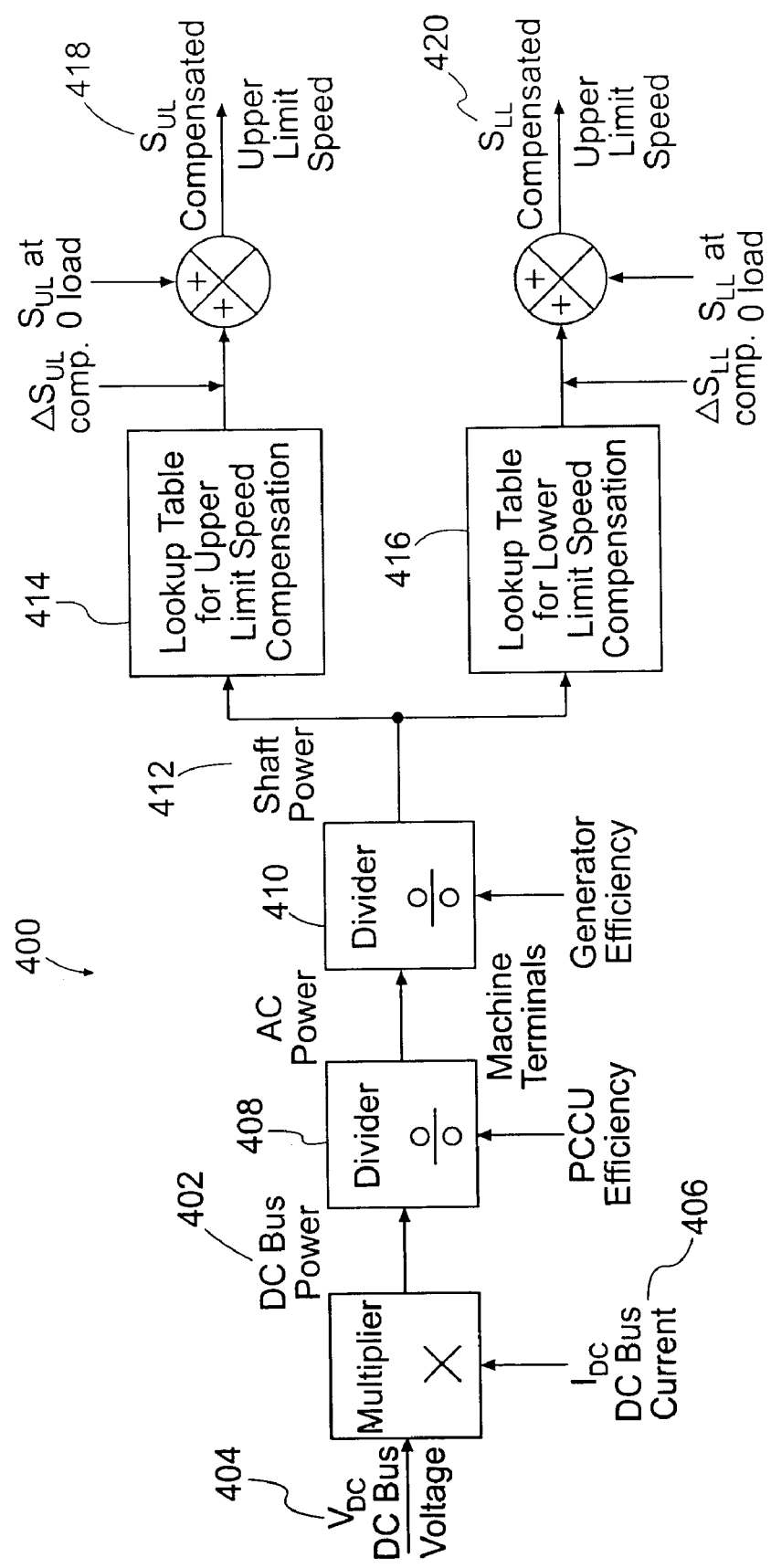
FIG. 4 is a block diagram illustrating a simplified speed droop compensation scheme according to one embodiment of the invention.

Generally, when constant control limits are used, a speed droop is observed as the power generated by a turbine increases. This effect is due primarily to valve delays as noted above. FIG. 4 is a block diagram illustrating a simplified a speed droop compensation scheme 400 according to one embodiment of the invention. One aspect of the speed-droop compensating scheme 400 is to implement variable-speed limits as a function of the load on a turbine. The delivered DC electric power 402 is calculated from the DC bus voltage 404 and the DC bus current 406. The voltage 404 and the current 406 are measured for control and protection purposes. The losses of the power conditioning, control unit (PCCU) 408 and generator 410 are accounted for by using an average efficiency for each component (e.g., PCCU Efficiency and Generator Efficiency, respectively). A more accurate calculation of losses is possible, if desired, by determining the actual losses for a particular generator.

The final result is the shaft power 412. Two lookup tables 414 and 416 are used for creating the compensated limits. The input for both lookup tables 414 and 416 is shaft power. In other embodiments of the invention, other types of analytical functions may be used instead of lookup tables 414 and 416 to provide speed limits. The outputs are $S_{UL}$ Compensated upper limit speed 418 and $S_{LL}$ Compensated lower limit speed 420. The outputs 418 and 420 of this control scheme are connected to the inputs 308 and 310 of the previously described bang-bang regulator in FIG. 3. The lookup tables 414 and 416 are predetermined theoretically and may be adjusted with zero-load factors (i.e., $\Delta S_{LL}$ and $S_{UL}$) for better accuracy.

The concept of the open-loop bang-bang controls is using pre-determined speed control limits to regulate On-Off control valves that control delivery of fuel and oxidizer. Once the characteristics of the particular turbine and valves are determined, the system speed control performance can be optimized by properly selecting the speed control limits.

Figure 5:
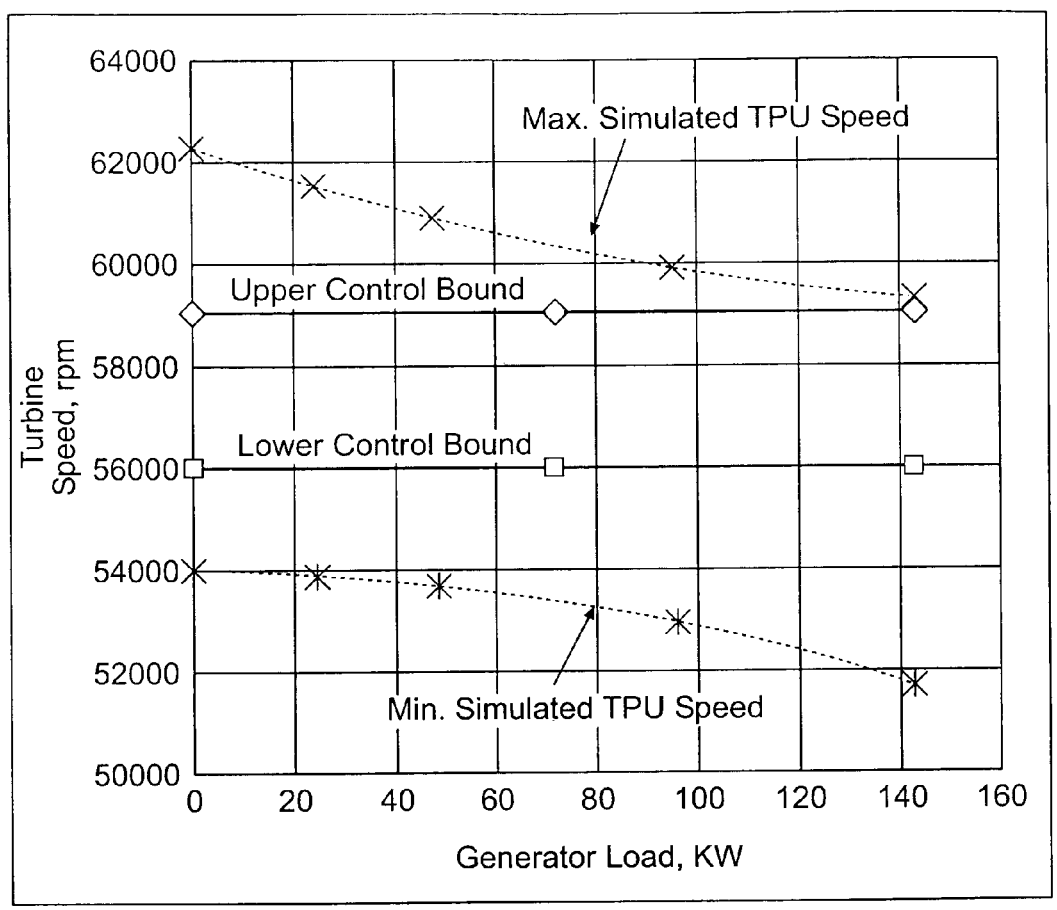
FIG. 5 illustrates a typical simulation result of optimized constant speed control bounds versus generator load.

FIG. 5 illustrates a typical simulation result of optimized constant speed control bands versus generator load. Because of the control valves' response times, turbine speed will overshoot the upper speed limit before the control valves are fully closed. Similarly, the turbine speed will go below the lower speed limit before the control valves are fully open. Speed overshoot at lower loads is typically more than the overshoot at higher loads. The comparison of speed undershoot is reversed. Higher load cases have more significant speed undershoot.

According to one embodiment of the invention, the speed control performance can be evaluated by a single value, speed performance index that is the difference between maximum speed at zero generator load and the minimum speed at generator full load. The lower the speed performance index the smaller and lighter the generator. To improve this speed performance index, the turbine speed droop at a higher generator load can be reduced by moving the speed control limits to a higher threshold.

Figure 6:
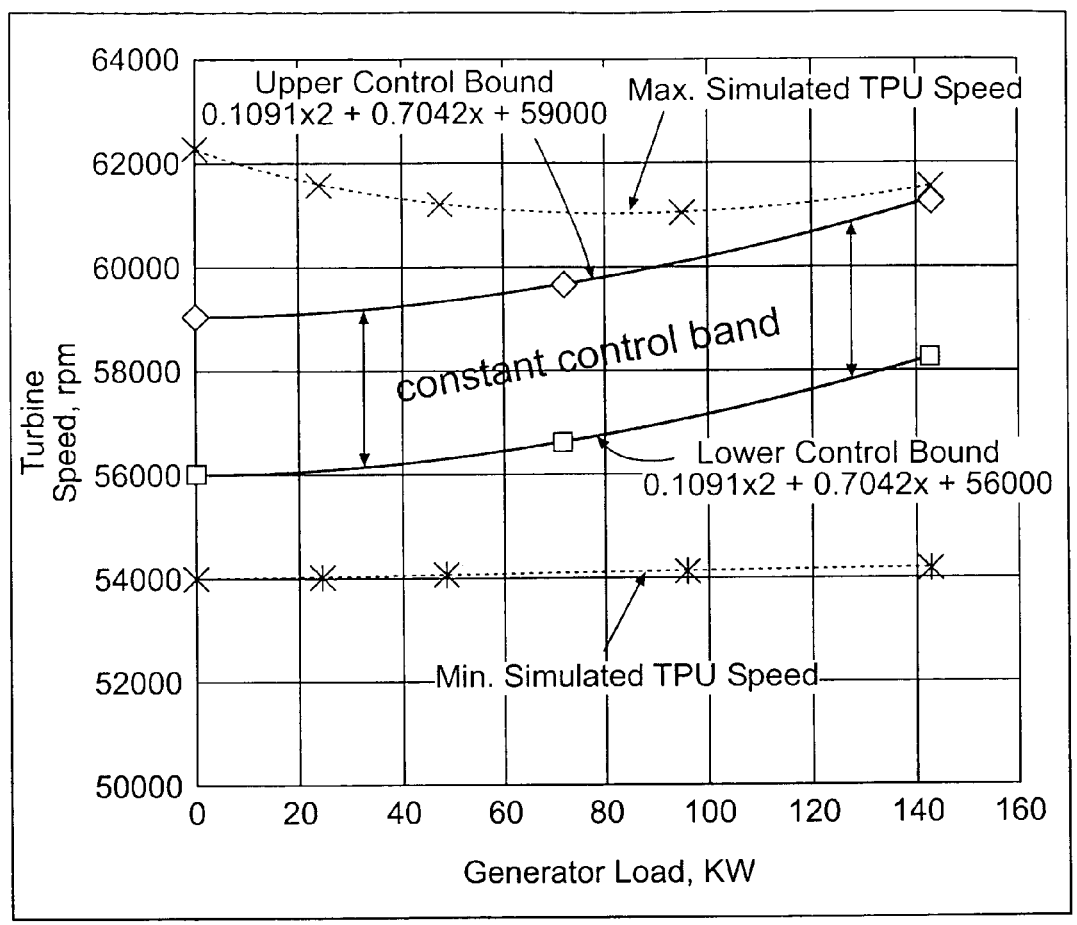
FIG. 6 illustrates a simulation result of adjustable turbine speed control that minimize turbine speed droop at a higher generator load according to one embodiment of the invention.

FIG. 6 illustrates a simulation result of adjustable turbine speed control bands that minimize turbine speed droop at a higher generator load according to one embodiment of the invention. While maintaining the same constant speed control band width, the absolute limits have been increased with respect to the generator load through, for example, second order polynomial interpolations. The benefit achieved in this example is about twenty percent (20%) improvement of the speed control performance index.

The bang-bang speed control method is based on the comparison of the turbine speed to predetermined speed thresholds or bounds. Since the control valves are either fully open or fully closed, the turbine receives either maximum torque, when the valves are open, or zero torque when the valves are closed. At maximum torque the speed increases linearly if the load is constant. At zero torque the speed decreases linearly at constant load.

Speed variations are unavoidable when using discrete valves with finite response times. This variation is often referred to as the speed band.

The initial goal is to maintain the speed band as narrow as possible since the system sizing is closely related to the magnitude of this speed band. A narrower speed band results in smaller and lighter system. On the other hand, a narrower speed band requires higher frequency of valve operation. Valves capable of operation at higher frequency require greater motive force and are generally larger, heavier, more expensive and less reliable than the slower operating valves.

Turbine speed is monitored as part of the speed control system. When the control valves are opened the turbine speed increases until it reaches a predetermined upper bound. The command to close the valves is then generated. Due to the valve delay, the actual turbine speed overshoots the upper bound. After the valve delay, with the valves closed, the turbine speed begins to decelerate. When the turbine speed reaches the lower bound a command to open the valves is generated.

Again due to the valve delays, a speed undershoot is observed. After the delay, the turbine speed begins to increase again and the cycle repeats in the same sequence.

The turbine speed overshoot is greatest at low loads where the acceleration rate is high. The speed undershoot is greatest at high loads where the deceleration rate is high. If however, the low bound is increased at high loads, the increased undershoot can be compensated. This adjustment allows the system to maintain a constant minimum speed (the bottom of the speed band) regardless of load. Similarly the upper speed bound can be adjusted to compensate for the variation in overshoot with load.

A mathematical simulation of the system can be used to optimize the operating bounds. If the goal is to achieve a constant minimum speed, the lower bound is defined such that the undershoot reaches the lowest desirable speed without load. The upper limit is defined in a similar manner. Then the lower bound is defined as a function of the load such that the minimal speed is the same at every load from zero to maximum. The model can also be used to adjust the upper bound such that the valves are not driven at a frequency higher than their maximum design frequency. The final adjustment of the speed bounds occurs during system integration tests with hardware replacing the mathematical models.

It is also possible to tailor the speed band for something other than minimum speed variation. For example, in some applications in may be advantageous to have the system operate in a lower speed band during low power operation than when at high power. The reduced speed might be used to reduce parasitic or windage losses during no-load operation.

According to one embodiment of the invention, the rotating assembly in the turbine 102 may be mounted on self-acting, hydrodynamic (foil) bearings. Other types of bearings could be beneficially used with this invention. Among these are externally pressurized hydraulic bearings, gas cooled ceramic ball bearings and even magnetic bearings.

One embodiment of the invention may use supercritical hydrogen and oxygen, reacted in a catalytic gas generator as the turbine propellants. The hydrogen propellant may be further used for cooling the turbo-generator, as the bearing process fluid, and for pressurizing the bearing cavity and power electronics. Other propellants may be used in a similar manner. Furthermore, a dedicated bearing fluid may be used instead of propellant, or separate cooling fluid may be used.

One implementation of the described invention provides a control method for an electric power generation system that includes power electronics, electromagnetic machine and turbine wheel mounted in a fixed orientation on a shaft. Other configurations with a gear-box may also be used. While some embodiments of the invention relate to electric power delivery, other types of power can be also delivered, such as hydraulic, pneumatic or mechanical, in various embodiments of the invention.

In one embodiment of the invention the turbine is an axial impulse type turbine wheel. Other turbine configurations may also be used. The electric power delivery may be 270 volts DC, although other DC distribution voltages may be generated in other implementations. Additionally, in other embodiments, the distribution system may be an AC type system.

According to one embodiment of the invention, the bang-bang control method described herein is implemented by a digital controller, such as a digital signal processor (DSP). In other implementations of the invention, a DSP controller and/or analog controller may be used instead.

In one embodiment of the invention, the power conditioning and control electronics are mounted on a cold plate, which in turn is wrapped around the generator. In this manner, the same heat exchanger is used to cool the machine stator and the power electronics. The heat exchanger may use hydrogen propellant or other coolants as a cooling fluid.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described preferred embodiment can be configured without departing from the scope and spirit of the invention. Therefore, it is to be understood that, within the scope of the appended claims, the invention may be practiced other than as specifically described herein.

What is claimed is:

1. A system comprising:
   a turbine generator;
   one or more two-position valves to provide one or more propellants to the turbine generator; and
   a controller coupled to the one or more two-position valves, the controller configured to
      determine an operating speed of the turbine generator,
      compare the operating speed to a reference speed,
      if the operating speed is greater than the reference speed then the one or more two-position valves are fully closed to reduce the speed of the turbine generator,
      if the operating speed is less than the reference speed then the one or more two-position valves are fully opened to increase the speed of the turbine generator,
      wherein the reference speed varies as a function of load on the turbine generator to decrease speed droop at increased loads.

2. The system of claim 1 wherein the reference speed limit includes an upper bound speed threshold and a lower bound speed threshold, if the operating speed is above the upper bound speed threshold then the one or more two-position valves are fully closed, and if the operating speed is below the lower bound speed threshold then the one or more two-position valves are fully opened.

3. The system of claim 2 wherein the upper bound speed threshold and lower bound speed threshold are adjusted based on the load on the turbine generator.

4. The system of claim 1 wherein the one or more propellants include hydrogen and oxygen.

5. The system of claim 1 further comprising:
   a first two-position valve to provide hydrogen to the turbine generator; and
   a second two-position valve to provide oxygen to the turbine generator,
   wherein, if the operating speed is greater than an upper limit speed then the first two-position valve is fully opened before the second two-position valve is opened, and
   if the operating speed is less than a lower limit speed then the second two-position valve is fully closed before the first two-position valve is closed.

6. The system of claim 5 wherein the upper limit speed is greater than the reference speed and the lower limit speed is less than the reference speed.

7. The system of claim 5 wherein the time interval between opening the first two-position valve and opening the second two-position valve is increased to decrease the temperature of the turbine generator.

8. The system of claim 1 wherein the load on the turbine generator is estimated from the delivered DC power and the average efficiencies of its components.

9. A method for controlling turbine speed comprising:
   determining the operating speed of the turbine;
   comparing the operating speed to an upper reference speed and a lower reference speed;
   increasing the speed of the turbine if the operating speed is less than the lower reference speed;
   decreasing the speed of the turbine if the operating speed is greater that the upper reference speed;
   determining the load on the turbine; and
   adjusting the upper reference speed and lower reference speed as a function of the load on the turbine.

10. The method of claim 9 further comprising:
    fully opening one or more two-position valves if increasing the speed of the turbine; and
    fully closing one or more two-position valves if decreasing the speed of the turbine.

11. The method of claim 9 further comprising:
estimating the delivered DC power by the turbine and the average efficiencies of the turbine components to determine the load on the turbine.

12. The method of claim 9 wherein the one or more propellants include hydrogen and oxygen.

13. The method of claim 12 wherein a first two-position valve to provide hydrogen to the turbine generator and a second two-position valve to provide oxygen to the turbine generator, and further comprising:
fully opening the first two-position valve before opening the second two-position valve if the operating speed is greater than an upper reference speed; and
closing the second two-position valve before closing the first two-position valve if the operating speed is less than a lower reference speed.

14. The method of claim 13 wherein the time difference between opening the first two-position valve and opening the second two-position valve is increased to decrease the temperature of the turbine generator.

15. A turbine comprising:
a power generator;
one or more two-position valves provide a propellant to the power generator;
a controller configured to
determine an operating speed for the turbine,
compare the operating speed to an upper reference speed and a lower reference speed,
increase the speed of the turbine if the operating speed is less than the lower reference speed,
decrease the speed of the turbine if the operating speed is greater that the upper reference speed,
determine the load on the turbine, and
adjust the upper reference speed and lower reference speed as a function of the load on the turbine to decrease speed droop at increased loads.

16. The turbine of claim 15 the controller is further configured to
fully open one or more two-position valves if increasing the speed of the turbine, and
fully close one or more two-position valves if decreasing the speed of the turbine.

17. The turbine of claim 15 further comprising:
a first two-position valve to provide hydrogen to the power generator; and
a second two-position valve to provide oxygen to the power generator,
wherein the controller is further configured to
fully open the first two-position valve before opening the second two-position valve if the operating speed is greater than an upper reference speed, and
fully close the second two-position valve before closing the first two-position valve if the operating speed is less than a lower reference speed.

18. The turbine of claim 15 wherein the load on the turbine generator is estimated from the power generator.

19. The turbine of claim 15 wherein the upper reference speed and the lower reference speed are adjusted based on the load on the turbine.

20. The turbine of claim 15 wherein the propellant includes hydrogen and oxygen.

* * * * *